United States Patent
Kang et al.

(10) Patent No.: US 12,264,752 B2
(45) Date of Patent: Apr. 1, 2025

(54) VALVE ACTUATOR

(71) Applicant: LG Electronics Inc., Seoul (KR)

(72) Inventors: Joohang Kang, Seoul (KR); Youngchan Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/209,921

(22) Filed: Jun. 14, 2023

(65) Prior Publication Data

US 2023/0400115 A1    Dec. 14, 2023

(30) Foreign Application Priority Data

Jun. 14, 2022  (KR) .................. 10-2022-0071891

(51) Int. Cl.
| | |
|---|---|
| *F16K 31/04* | (2006.01) |
| *F16K 27/06* | (2006.01) |
| *F16K 5/06* | (2006.01) |

(52) U.S. Cl.
CPC .......... *F16K 31/043* (2013.01); *F16K 27/067* (2013.01); *F16K 31/042* (2013.01); *F16K 5/0694* (2013.01)

(58) Field of Classification Search
CPC .... F16K 27/067; F16K 31/041; F16K 31/042; F16K 31/043
See application file for complete search history.

(56) References Cited

U.S. PATENT DOCUMENTS

| | | | | |
|---|---|---|---|---|
| 3,248,080 | A * | 4/1966 | Plasko | F16K 31/043 |
| | | | | 251/185 |
| 5,564,461 | A * | 10/1996 | Raymond, Jr. | F16K 1/221 |
| | | | | 403/337 |
| 6,953,182 | B2 * | 10/2005 | Lovell | F16K 31/1262 |
| | | | | 251/61 |
| 7,641,172 | B2 * | 1/2010 | Richards | E03B 7/071 |
| | | | | 251/129.11 |
| 11,174,960 | B2 * | 11/2021 | Hicks | F16K 31/043 |
| 2001/0035510 | A1 | 11/2001 | Oh | |
| 2007/0108402 | A1 | 5/2007 | Davis | |
| 2020/0208592 | A1 | 7/2020 | Hognabba et al. | |
| 2021/0310576 | A1 * | 10/2021 | Kasatochkin | F16K 31/043 |

FOREIGN PATENT DOCUMENTS

| | | |
|---|---|---|
| BR | 9603575 | 6/1998 |
| CA | 2177894 | 5/1997 |
| CN | 204628727 | 9/2015 |
| EP | 3561348 | 10/2019 |
| JP | 2002-188692 | 7/2002 |
| JP | 2013-040636 | 2/2013 |

OTHER PUBLICATIONS

Extended European Search Report in European Appln. No. 23174711.4, dated Nov. 8, 2023, 10 pages.

* cited by examiner

*Primary Examiner* — Kevin F Murphy
(74) *Attorney, Agent, or Firm* — Fish & Richardson P.C.

(57) ABSTRACT

A valve actuator comprises: a housing defining an inner space, a motor disposed in the inner space of the housing, a gear assembly disposed in the inner space of the housing and configured to transmit, to a ball valve, a driving force of the motor, a flange coupled to the ball valve, and a plurality of fastening members that couple the flange to the housing and including screws or bolts.

17 Claims, 10 Drawing Sheets

VALVE ACTUATOR

CROSS-REFERENCE TO RELATED APPLICATION

This application claims priority to and the benefit of Korean Patent Application No. 10-2022-0071891, filed in the Korean Intellectual Property Office on Jun. 14, 2022.

TECHNICAL FIELD

The present disclosure relates to a valve actuator for opening and closing a refrigerant, and more particularly, to a valve actuator that can be used by additionally mounting on various sizes of standard type ball valves supplied as a standard product and already installed.

BACKGROUND

Refrigerants play a crucial role in air conditioners, which are integral to air conditioning systems. However, the conventional refrigerants, ranging from the first to third generation refrigerants, have exhibited significant ozone layer depletion potential (ODP) and/or global warming potential (GWP).

In response to these concerns, efforts have been made in recent years to develop fourth-generation refrigerants that possess reduced ozone depletion potential and/or global warming potential. However, these newly developed refrigerants, such as hydrogen fluoroolefin (HFO)-based refrigerants, come with certain drawbacks. They tend to be more expensive than conventional refrigerants, and they also carry risk of flammability, which increases the potential for fire hazards and explosions.

Therefore, an air conditioning system including a ball valve for blocking refrigerant leakage is introduced.

The ball valve may include a ball in which a flow path is formed, a pipe into which the ball is inserted, a tap part provided in the pipe, and a stem installed in the tap part.

The ball valve can open and close the refrigerant by rotating the stem, and the air conditioning system may be provided with a valve actuator that is operated by an electrical signal received from the outside to block and operate the ball valve.

A conventional valve assembly, including a valve actuator, can be manufactured by assembling the valve actuator to a specially manufactured valve having a flange shape, and the valve actuator can form an appearance by inserting an upper case into a concave-convex portion of a lower case.

For example, the valve actuator provided in the valve assembly is designed to be compatible solely with a specially manufactured valve featuring a flange shape. Thus, attempting to install the valve actuator on a standard type ball valve already installed in the field becomes impracticable.

Ball valves are commonly manufactured in approximately 15 standards, while the tap part within the ball valve is typically produced in approximately three standards.

However, a conventional valve actuator can only be assembled with a specially manufactured valves featuring a flange shape as described above. Thus, it is not possible to install this valve actuator onto other standard type ball valves already present in the field.

In addition, the conventional valve actuator employs an assembly method where an upper case is inserted into a concave-convex portion of a lower case.

However, the conventional valve actuator lacks a seal at the joint between the upper case and the lower case, making it challenging to block the ingress of external elements into the interior of the valve actuator.

Therefore, due to the contraction and expansion of the upper case and the lower case caused by a temperature difference, there is a problem of decreased airtightness due to the presence of a minute gap at the joint between the upper case and the lower case.

In addition, the conventional valve actuator presents a problem in that manual operation is not possible.

Another conventional valve assembly is assembled by combining a valve actuator with a specially manufactured valves featuring a flange shape.

Therefore, the another conventional valve actuator can only be installed on a specially manufactured valves with a flange shape, making it impossible to add it to other standard type ball valve already installed in the field.

Another conventional valve assembly utilizes a principle where the valve actuator is attached by fastening, resembling the closure of a bottle cap, rather than relying on a flange shape.

However, the another conventional valve assembly encounters an issue where the valve and the valve actuator assembly may disengage due to a reaction force generated during valve rotation.

Another conventional valve actuator follows a design where the upper case is inserted into the concave-convex portion of the lower case.

However, the another conventional valve actuator lacks a seal at the joint between the upper case and the lower case. Further, the valve actuator does not incorporate a separate mold at a portion where the wire passes through the cover to connect the electric motor inside the valve actuator to a power source. Thus, it becomes challenging to block the ingress of external elements into the valve actuator.

Therefore, due to the temperature-induced contraction and expansion of the upper case and the lower case, the airtightness is compromised as a minute gap is generated at the joint between the upper case and the lower case.

SUMMARY

The present disclosure is directed to a valve actuator capable of solving at least one of the above problems, among others.

According to one aspect of the subject matter described in this application, a valve actuator can include a housing defining an inner space, a motor disposed in the inner space of the housing, a gear assembly disposed in the inner space of the housing and configured to transmit, to a ball valve, a driving force of the motor, a flange coupled to the ball valve, and a plurality of fastening members that couple the flange to the housing and including screws or bolts.

Implementations according to this aspect can include one or more of the following features. For example, the housing can include a lower case and an upper case coupled to the lower case, and the lower case can include a flange coupling part to which the flange is coupled by the plurality of fastening members.

In some examples, the flange can include a tap part insertion hole and a tap part (i) defining an inner surface of the tap part insertion hole and (ii) that couples to a tap portion of the ball valve, a stem insertion hole in fluid communication with the tap part insertion hole and configured to receive a stem of the ball valve, and a plurality of holes defined at a constant distance from a center of the tap part insertion hole and arranged to extend in a circumferential direction, and the flange coupling part can include a plurality of circular grooves into which the plurality of fastening members passing through the plurality of holes are fastened, respectively. In some examples, a number of the plurality of circular grooves can be at least twice a number of the plurality of holes.

In some implementations, a distance between two consecutive holes of the plurality of holes can be less than a distance between two consecutive circular grooves of the plurality of circular grooves. In some implementations, the flange can define a first chamfer at an inner surface of the tap part insertion hole, and the first chamfer can be configured to, based on the flange being coupled to the ball valve, contact a second chamfer defined at an upper end of the tap portion of the ball valve.

In some implementations, the housing can define a power line passage hole through which an external power line configured to supply power to the motor passes, the power line passage hole can be configured to, based on the external power line being passed through the power line passage hole, receive an adhesive, and an inner surface of the housing around the power line passage hole can be provided with an adhesive receiving groove (i) greater than the power line passage hole and (ii) in which a portion of the adhesive is received.

In some examples, the lower case can define a seating part at an upper end, the seating part on which a protruding jaw of a middle plate disposed in the inner space of the housing is seated and configured to receive a first sealing ring, and the first sealing ring can be supported by a lower end of the upper case, the seating part of the lower case, and the protruding jaw of the middle plate. In some examples, a second sealing ring can be disposed between an upper surface of the flange and a lower surface of the flange coupling part.

In some implementations, the motor and the gear assembly can be disposed in a space provided between the middle plate and the lower case. In some examples, the gear assembly can include an input gear coupled to a rotational shaft of the motor and configured to rotate with the rotational shaft, an output gear spaced apart from the input gear in a horizontal direction, coupled to a stem of the ball valve, and configured to transmit a rotational force of the input gear to the stem, and a power transmission gear configured to transmit the rotational force of the input gear to the output gear, and the power transmission gear can include a clutch shaft (i) having both ends coupled to the middle plate and the lower case so as to be movable in a vertical direction, (ii) including a first gear set including a first gear and a second gear that are coupled to the clutch shaft and that are configured to, based on vertical movement of the clutch shaft, disengage from or couple to each other.

In some examples, the first gear can provide a coupling part that couples the first gear to the second gear and protruding from a lower surface of the first gear coupled to the input gear, an upper surface of the second gear can provide a coupling part insertion groove into which the coupling part of the first gear is inserted, the clutch shaft can provide a push-up part that is configured to push the first gear upward by contacting the coupling part of the first gear and that is positioned in a push-up part insertion groove provided at a lower surface of the coupling part of the first gear. In some implementations, the first gear can be configured to move toward the second gear by a return spring disposed between the first gear and the middle plate.

In some implementations, the valve actuator can further include a snap ring disposed at the clutch shaft and between the return spring and an upper surface of the first gear. In some implementations, the valve actuator can further include a third sealing ring is disposed at the clutch shaft and below the second gear, the lower case can provide a guide groove at which the clutch shaft is coupled and configured to, based on the clutch shaft moving in the vertical direction, allow the third sealing ring to move in the vertical direction with the clutch shaft.

In some examples, a movement distance of the clutch shaft in an upward direction can be based on a gap between the third sealing ring and the second gear. In some examples, a lower end of an output shaft coupled to the output gear can be coupled to the stem of the ball valve, an upper end of the output shaft can protrude to an outside of the upper case, and a fourth sealing ring can be disposed between the output shaft and the lower case and between the lower end of the output shaft and the output gear.

In some implementations, a fifth sealing ring can be disposed between the output shaft and the upper case and between the upper end of the output shaft and the output gear. In some implementations, the power transmission gear can further include a second gear set disposed adjacent to the first gear set in the horizontal direction, and the second gear set can includes a third gear coupled to the first gear, and a fourth gear disposed above the third gear, configured to rotate with the third gear, and coupled to the output gear. In some examples, the upper case can be configured to receive a cap that covers (i) the upper end of the output shaft protruding to the outside of the upper case and (ii) a gap provided between the upper case and the output shaft.

DETAILED DESCRIPTION

Figure 1:
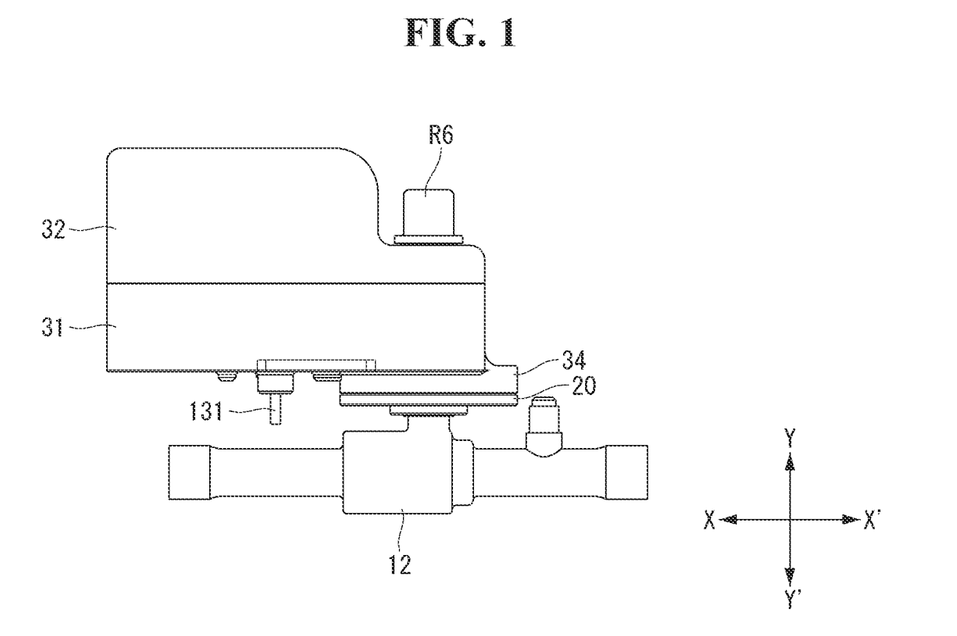
FIG. 1 is a diagram illustrating an example of a valve actuator and a ball valve that are assembled.
Figure 2:
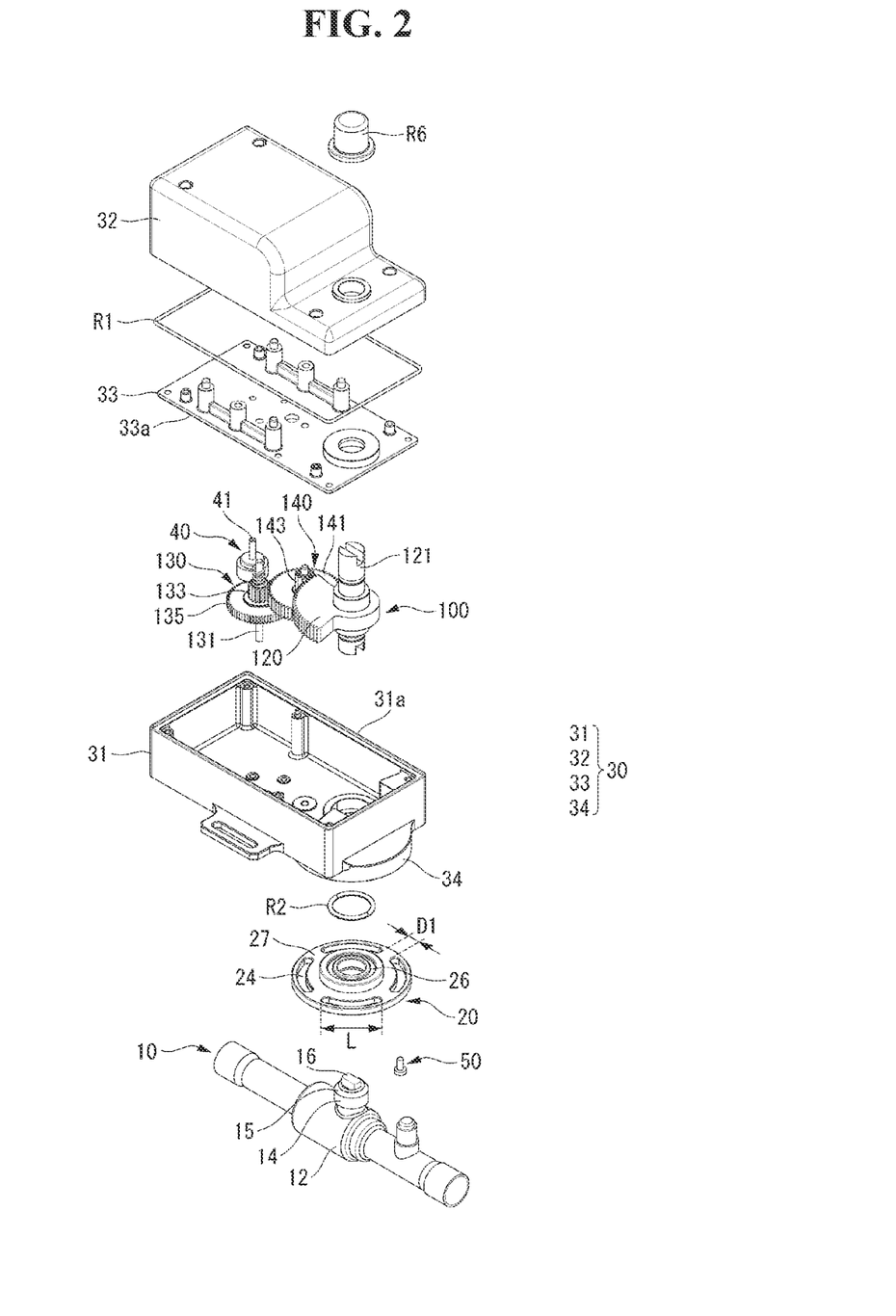
FIG. 2 is a diagram illustrating an exploded perspective view of an example of main parts of FIG. 1, as viewed from above.
Figure 3:
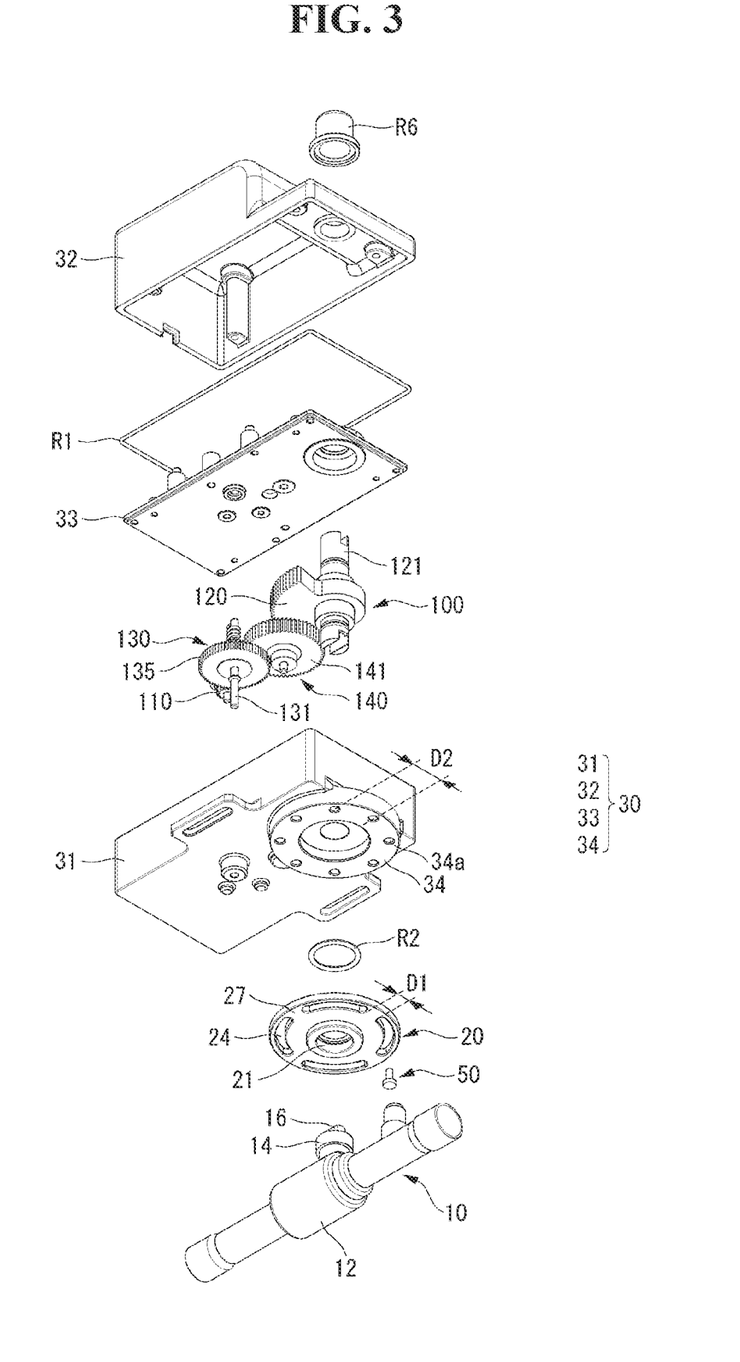
FIG. 3 is a diagram illustrating an exploded perspective view of an example of main parts of FIG. 1, as viewed from bottom.

FIG. 1 is a diagram illustrating an example of a valve actuator and a ball valve that are assembled, FIG. 2 is a diagram illustrating an exploded perspective view of an example of main parts of FIG. 1, as viewed from above, and FIG. 3 is a diagram illustrating an exploded perspective view of an example of main parts of FIG. 1, as viewed from bottom.

Figure 4:
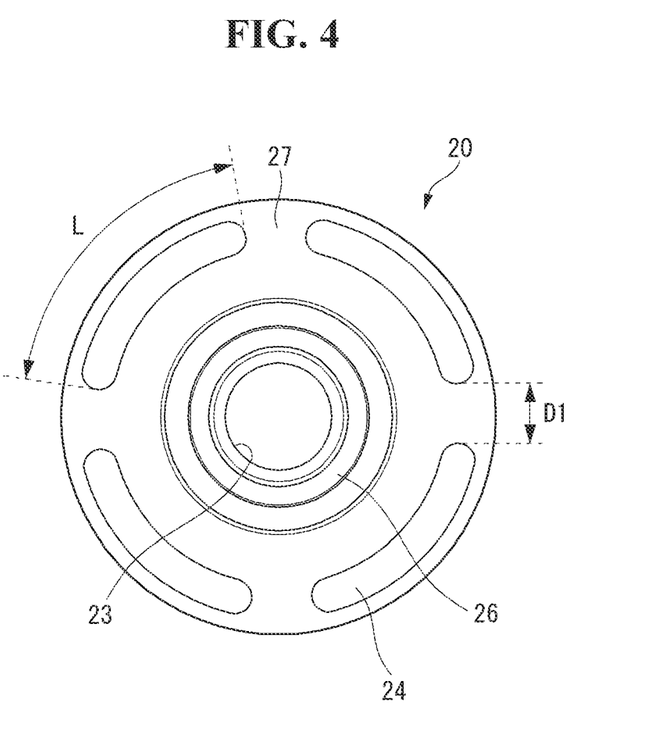
FIG. 4 is a diagram illustrating a plan view of an example of a flange.
Figure 5:
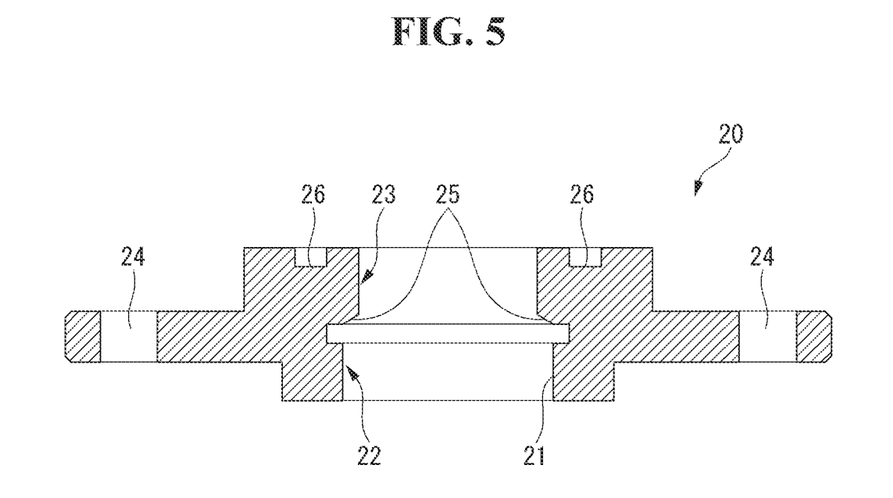
FIG. 5 is a diagram illustrating a cross-sectional view of an example of a flange.
Figure 6:
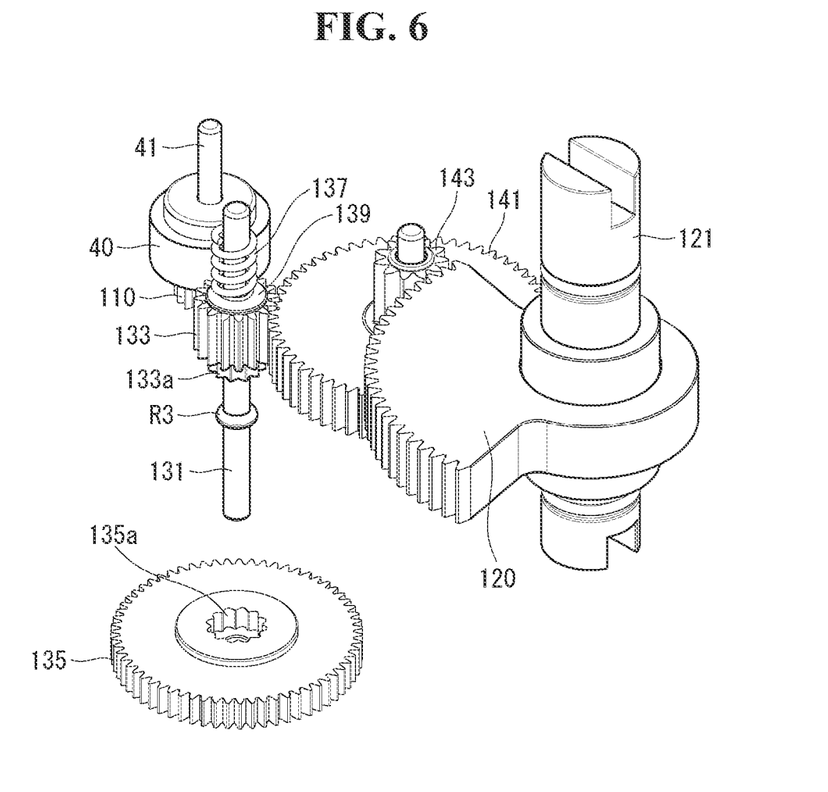
FIG. 6 is a diagram illustrating an example of a gear assembly in which a first gear and a second gear coupled to a clutch shaft are disassembled, as viewed from above.
Figure 7:
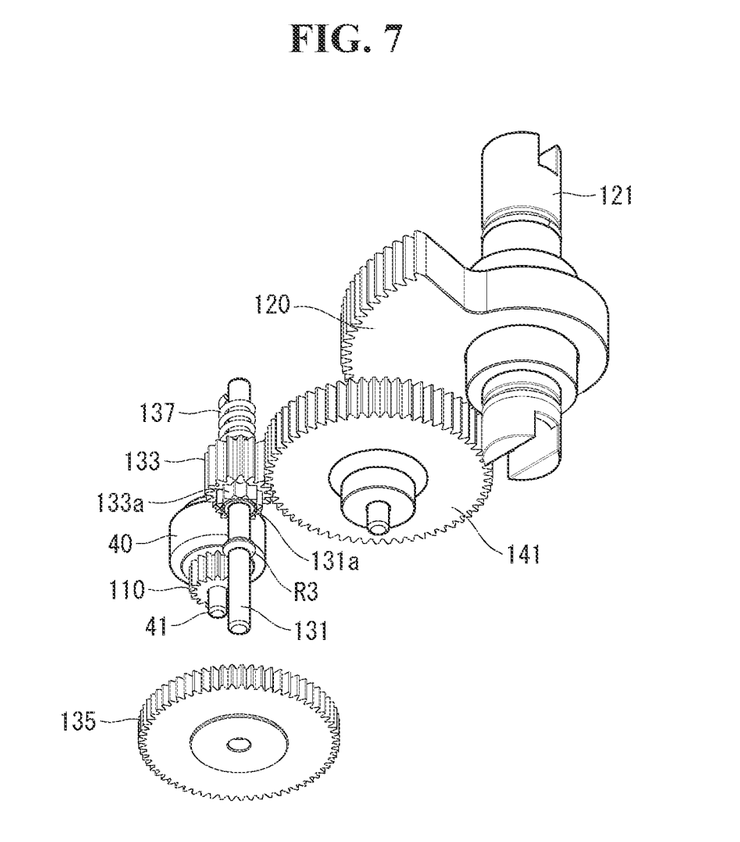
FIG. 7 is a diagram illustrating an example of a gear assembly in which a first gear and a second gear coupled to a clutch shaft are disassembled, as viewed from bottom.

FIG. 4 is a diagram illustrating a plan view of an example of a flange, FIG. 5 is a diagram illustrating a cross-sectional view of an example of a flange, FIG. 6 is a diagram illustrating an example of a gear assembly in which a first gear and a second gear coupled to a clutch shaft are disassembled, as viewed from above, and FIG. 7 is a diagram illustrating an example of a gear assembly in which a first gear and a second gear coupled to a clutch shaft are disassembled, as viewed from bottom.

Figure 8:
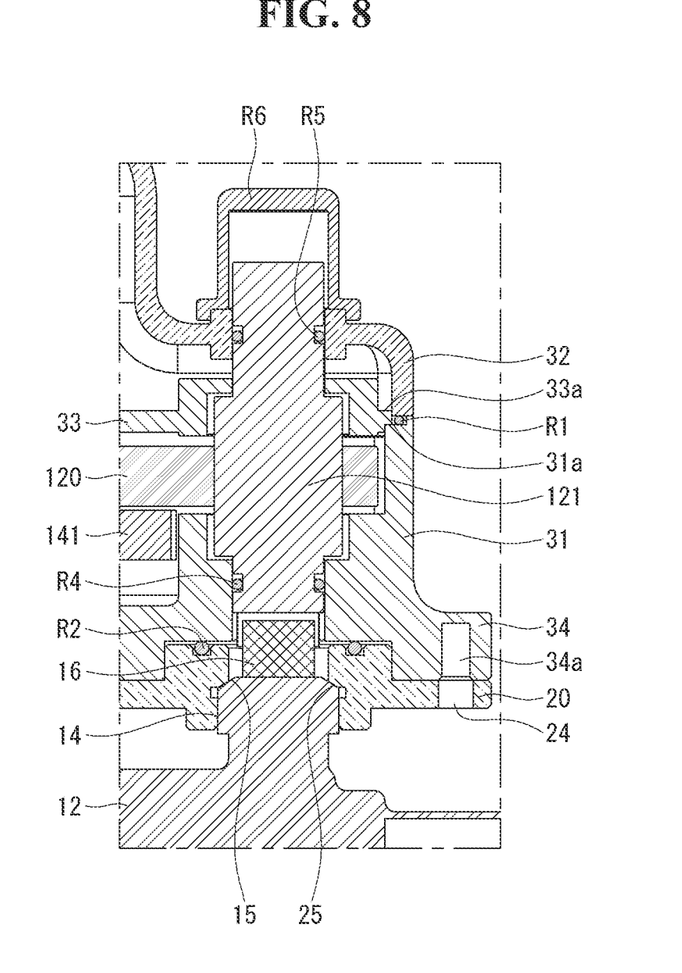
FIG. 8 is a diagram illustrating a cross-sectional view of an example of a state in which an output shaft of a gear assembly is assembled to a housing and a flange.
Figure 9:
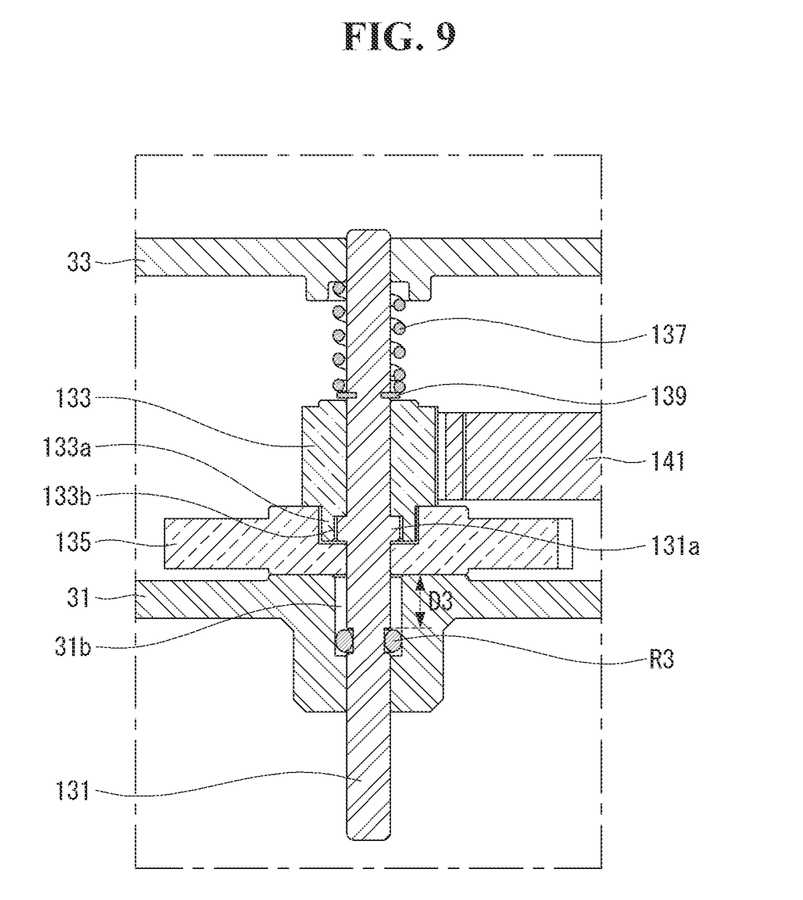
FIG. 9 is a diagram illustrating a cross-sectional view of an example of a state in which a clutch shaft, first gear, and second gear of a gear assembly are assembled to a housing.

FIG. 8 is a diagram illustrating a cross-sectional view of an example of a state in which an output shaft of a gear assembly is assembled to a housing and a flange, and FIG. 9 is a diagram illustrating a cross-sectional view of an example of a state in which a clutch shaft, first gear, and second gear of a gear assembly are assembled to a housing.

Figure 10:
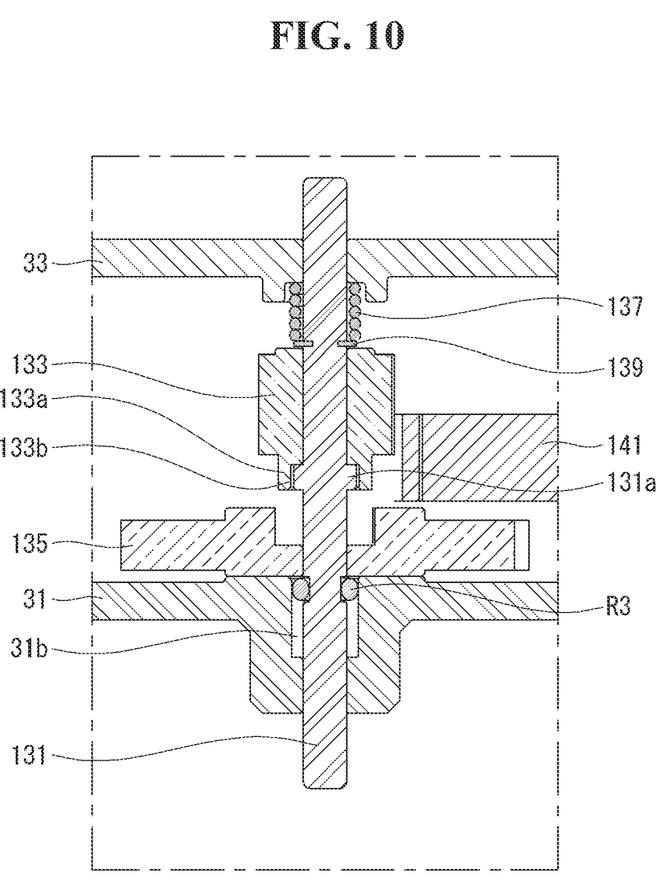
FIG. 10 is a diagram illustrating a cross-sectional view of an example of a state in which a clutch shaft of a gear assembly is pressed.
Figure 11:
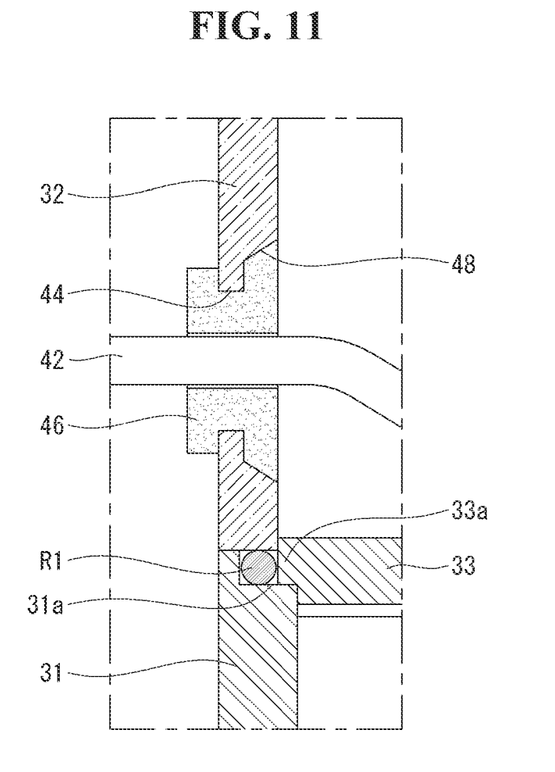
FIG. 11 is a diagram illustrating a cross-sectional view of an example of a state in which an adhesive is applied to a power line passage hole of a housing.

FIG. 10 is a diagram illustrating a cross-sectional view of an example of a state in which a clutch shaft of a gear assembly is pressed, and FIG. 11 is a diagram illustrating a cross-sectional view of an example of a state in which an adhesive is applied to a power line passage hole of a housing.

A ball valve 10 provided in the air conditioning system to block refrigerant leakage includes a ball in which a flow path is defined, a pipe 12 into which the ball is inserted, a tap part 14 provided in the pipe 12, and a stem 16 installed on the tap part 14.

In some implementations, to install a valve actuator on the tap part 14 of the standardized ball valve 10, the valve actuator can include a flange 20 screwed to the tap part 14 of the ball valve 10 but coupled to a housing 30 of the valve actuator by a fastening member such as a screw or bolt.

In some implementations, the valve actuator can be additionally installed to the ball valves 10 of various standards already provided in the field. For example, according to the structure in which the flange 20 is provided separately from the ball valve 10 and the housing 30 and coupled to the ball valve 10 and the housing 30 by a separate fastening member or a separate fastening method, the valve actuator can be additionally installed to the ball valves 10 of various standards already provided in the field.

The flange 20 can have a tap part insertion hole 22, and the tap part insertion hole 22 can be surrounded by a tap part 21 providing on an inner surface to receive the tap part 14 of the ball valve 10.

In some implementations, a stem insertion hole 23 communicating with the tap part insertion hole 22 and into which the stem 16 of the ball valve 10 is inserted, and a plurality of long holes 24 positioned at a certain distance from the center of the tap part insertion hole 22 and formed long in the circumferential direction can be further provided.

In some implementations, the flange 20 has a chamfer 25 defined at the inner surface of the tap part insertion hole 22.

In some implementations, a chamfer 15 having a shape corresponding to the chamfer 25 of the flange 20 is provided at the top of the tap part 14 of the ball valve 10.

For example, in a state where the flange 20 is screwed to the tap part 14 of the ball valve 10, the chamfer 25 of the flange 20 is in contact with the chamfer 15 provided at the upper end of the tap part 14 of the ball valve 10.

In some implementations, a supporting reaction force can be generated by the chamfers 15 and 25 in contact with each other in a state where the flange 20 is screwed to the tap part 14 of the ball valve 10.

In this regard, even if the valve turning torque is greater than the screw fastening force between the tap part 21 of the flange 20 and the tap part 14 of the ball valve 10, loosening between the tap part 21 of the flange 20 and the tap part 14 of the ball valve 10 can be suppressed, and the assembly state between the tap part 21 of the flange 20 and the tap part 14 of the ball valve 10 can be maintained.

In some implementations, when screwing the tap part 21 of the flange 20 to the tap part 14 of the ball valve 10, even if the starting point of the thread formed in the tap part 14 of the ball valve 10 is not constant, the tap part 21 of the flange 20 can be screwed to the tap part 14 of the ball valve 10.

The flange 20 can further include a ring insertion groove 26 defined at the upper surface and in which a second seal ring R2 is disposed.

In some implementations, a minute gap provided between the flange 20 and a flange coupling part 34 can block moisture from entering the inside of the housing 30.

The housing 30 can define a space in which a motor 40 and a gear assembly 100 provided in the valve actuator are received.

The housing 30 can include a lower case 31, an upper case 32 coupled to the lower case 31, a middle plate 33 positioned in an inner space provided by the lower case 31 and the upper case 32, and a flange coupling part 34 provided on the lower case 31 and coupled to the flange 20.

In some implementations, the motor 40 and the gear assembly 100 may be disposed in a space provided by the middle plate 33 and the lower case 31 and will be described below in further detail.

In some implementations, the motor 40 may be disposed in a space provided by the middle plate 33 and the upper case 32, such that the arrangement of the plurality of gears provided in the gear assembly 100 may be different.

The flange coupling part 34 of the housing 30 can have a plurality of circular grooves 34a into which a plurality of fastening members 50 passing through the plurality of long holes 24 can be fastened, respectively.

Each of the plurality of long holes 24 can communicate with at least one of the plurality of circular grooves 34a.

In some implementations, a number of the plurality of circular grooves 34a may be twice or more than the number of the plurality of long holes 24.

In this regard, when the number of the plurality of circular grooves 34a is twice or more than the number of the plurality of long holes 24, when the flange 20 is screwed to the tap part 14 of the ball valve 10, even if a starting point of the thread defined at the tap part 14 of the ball valve 10 is not constant, the flange 20 can be screwed into the tap part 14 of the ball valve 10.

In some implementations, the number of the plurality of circular grooves 34a can be same as the number of the plurality of long holes 24.

In some implementations, the number of the plurality of circular grooves 34a can be 1.5 times or more and less than 2 times the number of the plurality of long holes 24.

In this regard, after screwing the tap part 21 of the flange 20 to the tap part 14 of the ball valve 10, when coupling the housing 30 to the flange 20 using the fastening member 50, even if the rotational phase of the flange 20 is different, the flange 20 can be smoothly fastened to the flange coupling part 34 of the housing 30.

In some implementations, the rotational phase of the flange 20 may vary depending on the starting point of a thread provided in the tap part of the ball valve.

In some implementations, the flange 20 can be coupled to ball valves 10 of different various standards with starting points of threads provided in the tap part.

In some implementations, a distance D1 between the two adjacent long holes 24 can be less than a distance D2 between the two adjacent circular grooves 34a.

In some implementations, a bridge 27 is positioned between the two adjacent long holes 24, and the width of the bridge 27, that is, the distance D1 between the two adjacent long holes 24 can be less than the length L of the long holes 24.

Thus, the strength of the flange 20 can be maintained due to the bridge 27.

The housing 30 can have a power line passage hole 44 through which an external power line 42 for supplying power to the motor 40 passes, and an adhesive 46 can be applied to the power line passage hole 44 in a state where the external power line 42 passes through.

The power line passage hole 44 can be defined in the lower case 31 or the upper case 32.

In some implementations, one power line passage hole 44 may be partially defined in each of the lower case 31 and the upper case 32, and it may be defined as a whole in a state in which the lower case 31 and the upper case 32 are coupled.

The adhesive 46 applied to the power line passage hole 44 can block moisture from entering the inside of the housing 30 through the power line passage hole 44.

To block the adhesive 46 applied to the power line passage hole 44 from being separated and/or detached from the housing 30, the inner surface of the housing 30 around the power line passage hole 44 can be provided with an adhesive receiving groove 48 provided to be larger than the power line passage hole 44 and in which a portion of the adhesive 46 is positioned.

Therefore, the adhesive 46 applied to the power line passage hole 44 can be blocked from being separated and/or detached from the power line passage hole 44.

A seating part 31a on which a protruding jaw 33a of the middle plate 33 is seated can be provided at an upper end of the lower case 31 of the housing 30.

In some implementations, a first seal ring R1 is disposed on the seating part 31a of the lower case 31.

The first seal ring R1 can be supported by a lower end of the upper case 32, the seating part 31a of the lower case 31, and the protruding jaw 33a of the middle plate 33, respectively.

In some implementations, the first seal ring R1 is pressed in the vertical (Y-Y') direction by the upper case 32 and the lower case 31.

In addition, the first seal ring R1 can be pressed in the horizontal (X-X') direction by the protruding jaw 33a of the middle plate 33 and the seating part 31a of the lower case 31, or supported in the horizontal (X-X') direction by the protruding jaw 33a of the middle plate 33 and the seating part 31a of the lower case 31.

Therefore, when the upper case 32 and the lower case 31 contract and expand due to the temperature difference during use of the valve actuator, it is possible to prevent airtightness from deteriorating due to a minute gap between the upper case 32 and the lower case 31.

The motor 40 and the gear assembly 100 can be disposed in a space provided by the lower case 31 and the middle plate 33 in the inner space of the housing 30.

In some implementations, the motor 40 may be disposed in a space provided by the middle plate 33 and the upper case 32, such that the arrangement of the plurality of gears provided in the gear assembly 100 may be different.

When the motor 40 and the gear assembly 100 are disposed in the space provided by the lower case 31 and the middle plate 33 in the inner space of the housing the length of the rotational shaft of the motor 40 and the shaft coupled to the gears of the gear assembly 100 may be formed short, and the size of the space occupied by the middle plate 33 and the upper case 32 can be reduced. Accordingly, the size of the valve actuator can be reduced.

The motor 40 may be a type of motor with precise rotational control. In some implementations, the motor 40 may be a type of motor with imprecise rotational control. In addition, the motor 40 can be a normal/reverse rotation motor.

The gear assembly 100 can include an input gear 110 coupled to a rotational shaft 41 of the motor 40 and rotating together with the rotational shaft 41, and an output gear 120 spaced apart from the input gear 110 in the horizontal (X-X') direction The gear assembly 100 can further include power transmission gears 130 and 140 that transmit the rotational force of the input gear 110 to the output gear 120.

The output gear 120 can be coupled to the stem 16 of the ball valve 10 and transmit the rotational force of the input gear 110 to the stem 16 of the ball valve 10.

In some implementations, the power transmission gear includes a first gear set 130 and a second gear set 140 disposed adjacent to the first gear set 130 in the horizontal (X-X') direction.

The first gear set 130 can include a clutch shaft 131 having both ends coupled to the middle plate 33 and the lower case 31 so as to be movable in the vertical (Y-Y') direction.

In addition or alternatively, the first gear set 130 can further include a first gear 133 and a second gear 135 that are coupled to the clutch shaft 131 and disengaged from each other or coupled to each other by the movement of the clutch shaft 131 in the vertical (Y-Y') direction.

The clutch shaft 131 and the first gear set 130 can constitute a clutch unit in the valve actuator.

If the clutch unit is not operated in a state in which the motor 40 is driven and the ball valve 10 blocks the flow of refrigerant, when trying to return the ball valve 10 to its original position (a position where refrigerant can flow) in a state where the gears of the gear assembly are meshed with each other, there is a possibility that the teeth of the gears provided in the gear assembly may be damaged.

In order to solve this problem, a clutch unit can be provided in the valve actuator.

In the conventional valve actuator, the clutch unit is installed on the output shaft of the gear assembly.

Therefore, since the output shaft moves in two directions, a rotational direction and a vertical (Y-Y') direction, there is a problem in that sealing performance is deteriorated, and since the output shaft has to move in the vertical (Y-Y') direction, there is a problem in that the size of the product increases.

In addition, since a large rigid return spring is required to return the output shaft, and the engagement between the gear teeth is directly disengaged, there is a problem in that gear teeth are adversely affected.

However, according to implementations of the clutch unit, since the middle shaft (shaft of the power transmission gear) of the gear train, not the output shaft, is provided as the clutch shaft 131, the clutch shaft 131 can be operated with less force compared to the case where the output shaft is used as the clutch shaft.

In addition, since the first gear 133 and the second gear 135 may be coupled or disengaged according to the movement of the clutch shaft 131 in the vertical (Y-Y') direction, when the clutch shaft 131 is operated, coupling between gears can be disengaged, not disengagement of coupling between gear teeth.

Therefore, when the clutch shaft 131 moves in the vertical (Y-Y') direction, the influence on the teeth of the input gear 110, the output gear 120, and the power transmission gears 130 and 140 can be minimized.

A coupling part 133a for coupling the first gear 133 to the second gear 135 can protrude from the lower surface of the first gear 133 coupled to the input gear 110.

In some implementations, a coupling part insertion groove 135a into which the coupling part 133a of the first gear 133 is inserted can be provided on the upper surface of the second gear 135.

The coupling part 133a and the coupling part insertion groove 135a may have shapes corresponding to each other.

In some implementations, the coupling part 133a can have a planar shape and the coupling part insertion groove 135a can have a spline shape. In some implementations, the coupling part 133a and the coupling part insertion groove 135a can have various shapes such as an ellipse or a polygon.

When the coupling part 133a of the first gear 133 is inserted into the coupling part insertion groove 135a of the second gear 135, the height or thickness of the first gear set 130 in the vertical (Y-Y') direction can be reduced.

Accordingly, since the size of the space occupied by the middle plate 33 and the lower case 31 can be reduced, the size of the valve actuator can be reduced.

A push-up part 131a can be provided on the clutch shaft 131 to push the first gear 133 upward in contact with the coupling part 133a of the first gear 133.

In addition, a push-up part insertion groove 133b can be provided on the lower surface of the coupling part 133a of the first gear 133.

Therefore, the push-up part 131a of the clutch shaft 131 can be inserted into the push-up part insertion groove 133b provided on the lower surface of the coupling part 133a of the first gear 133.

When the push-up part 131a of the clutch shaft 131 is inserted into the push-up part insertion groove 133b provided on the lower surface of the coupling part 133a of the first gear 133, the height or thickness of the first gear set 130 in the vertical (Y-Y') direction can be reduced.

Therefore, since the size of the space occupied by the middle plate 33 and the lower case 31 can be further reduced, the size of the valve actuator can be further reduced.

A return spring 137 can be disposed on the clutch shaft 131 above the first gear 133.

In some implementations, the first gear 133 can be pressed toward the second gear 135 by the return spring 137.

In this regard, the first gear 133 and the second gear 135 can be coupled to each other between the gears before the valve actuator operates.

For example, before the operation of the valve actuator, since the coupling part 133a of the first gear 133 is coupled to the coupling part insertion groove 135a of the second gear 135, the first gear 133 and the second gear 135 can be coupled to each other between the gears.

In addition, after the operation of the valve actuator when the clutch shaft 131 is pressed from the bottom to the top to return the ball valve to its original position, while the return spring 137 is pressed, the first gear 133 can be pushed up by the push-up part 131a, and accordingly, the coupling between the first gear 133 and the second gear 135 can be disengaged.

In some implementations, when pressing of the clutch shaft 131 is disengaged while rotating the output shaft 121 by inserting a tool such as a screwdriver into a groove provided at the upper end of the output shaft 121, the first gear 133 can be pressed downward by the return spring 137.

Therefore, while the output shaft 121 of the output gear 120 rotates and the coupling part 133a of the first gear 133 is inserted into the coupling part insertion groove 135a of the second gear 135, the first gear 133 and the second gear 135 can be coupled again.

A snap ring 139 can be installed on the clutch shaft 131 between the return spring 137 and the upper surface of the first gear 133.

The snap ring 139 can be provided on the clutch shaft 131 to allow the clutch shaft 131 to be manually pulled in case the clutch shaft 131 does not return to the original position due to the malfunction of the return spring 137.

Therefore, when the first gear 133 does not move downward due to the malfunction of the return spring 137 despite the disengagement of the pressing of the clutch shaft 131, when the clutch shaft 131 is pulled downward, the snap ring 139 can move downward together with the clutch shaft 131, so that the coupling part 133a of the first gear 133 can be coupled to the coupling part insertion groove 135a of the second gear 135.

A third seal ring R3 can be disposed on the clutch shaft below the second gear 135.

In the lower case 31 where the clutch shaft 131 is coupled when the clutch shaft 131 moves in the vertical (Y-Y') direction, a guide groove 31b can be provided to guide the third seal ring R3 to move in the vertical (Y-Y') direction together with the clutch shaft 131, the guide groove 31b can extend to the inner surface of the lower case 31.

Therefore, the moving distance of the clutch shaft 131 in the upward direction can be set by a distance D3 between the third seal ring R3 and the second gear 135.

In this regard, by appropriately setting the distance D3 between the third seal ring R3 and the second gear 135, the moving distance of the clutch shaft 131 in the upward direction can be adjusted.

In the state where the coupling between the gears of the first gear 133 and the second gear 135 is disengaged, the second gear 135 may be supported by the third seal ring R3 and/or the lower case 31.

Therefore, in the state where the coupling between the gears of the first gear 133 and the second gear 135 is disengaged, the downward movement of the second gear 135 can be limited by the third sea ring R3 and/or the lower case 31.

In some implementations, when the second gear 135 is spaced apart from the inner surface of the lower case 31 by a certain distance, a separate support shaft for supporting the second gear 135 outside the clutch shaft 131 can be provided.

In this regard, in a state where the coupling between the gears of the first gear 133 and the second gear 135 is disengaged, the downward movement of the second gear 135 may be limited by a separate support shaft.

In addition, if a part of the second gear 135 is positioned below the motor 40 and a third gear 141, when disengaging the coupling between the gears of the first gear 133 and the second gear 135, the upward movement of the second gear 135 may be limited by the motor 40 and the second gear set 140.

The second gear set 140 can be disposed adjacent to the first gear set 130 in the horizontal (X-X') direction.

The second gear set 140 can be coupled to the first gear 133 and include the third gear 141 in which a part of the second gear 135 is positioned at the lower portion.

In some implementations, the second gear set 140 can be positioned above the third gear 141 and can further include a fourth gear 143 that rotates integrally with the third gear 141 and is coupled to the output gear 120.

The third gear 141 and the fourth gear 143 constituting the second gear set 140 may be formed as one body, or may be manufactured separately and coupled between gears with a structure similar to that of the first and second gears 133 and 135.

Jin some implementations, since the power transmission gear includes the first gear set 130 and the second gear set 140, the structure of the gear assembly 100 can be simplified.

The lower end of the output shaft 121 coupled with the output gear 120 can be coupled to the stem 16 of the ball valve 10, and the upper end of the output shaft 121 can protrude to an outside of the upper case 32.

In addition, a fourth seal ring R4 can be disposed between the output shaft 121 and the lower case 31 between the lower end of the output shaft 121 and the output gear 120.

In some implementations, the refrigerant flowing along the ball valve 10 can be blocked from entering the inside of the valve actuator through a minute gap provided between the output shaft 121 and the lower case 31.

A fifth seal ring R5 can be disposed between the output shaft 121 and the upper case between the upper end of the output shaft 121 and the output gear 120.

In some implementations, moisture can be blocked from entering the inside of the housing 30 through a minute gap provided between the upper case 32 and the output shaft 121.

In the upper case 32, a cap R6 covering the upper end of the output shaft 121 protruding out of the upper case 32 can be installed.

In addition, the cap R6 can cover the minute gap between the output shaft 121 and the upper case 32.

In some implementations, moisture can be more effectively blocked from entering the inside of the housing 30 through the minute gap provided between the upper case 32 and the output shaft 121.

In the above, the valve actuator for controlling the ball valve provided in the air conditioning system has been described, but the valve actuator of the present disclosure can be applied to other valves for controlling a flow path of gas or fluid.

What is claimed is:

1. A valve actuator comprising:
    a housing defining an inner space;
    a motor disposed in the inner space of the housing;
    a gear assembly disposed in the inner space of the housing and configured to transmit, to a ball valve, a driving force of the motor;
    a flange coupled to the ball valve; and
    a plurality of fastening members that couple the flange to the housing and including screws or bolts,
    wherein the housing includes a lower case and an upper case coupled to the lower case, and the lower case includes a flange coupling part to which the flange is coupled by the plurality of fastening members,
    wherein the flange includes:
        a tap part insertion hole and a tap part (i) defining an inner surface of the tap part insertion hole and (ii) that couples to a tap portion of the ball valve,
        a stem insertion hole communicating with the tap part insertion hole and configured to receive a stem of the ball valve, and
        a plurality of holes defined at a constant distance from a center of the tap part insertion hole and arranged to extend in a circumferential direction,
    wherein the flange coupling part includes a plurality of circular grooves into which the plurality of fastening members passing through the plurality of holes are fastened, respectively,
    wherein the housing defines a power line passage hole through which an external power line configured to supply power to the motor passes,
    wherein the power line passage hole is configured to, based on the external power line being passed through the power line passage hole, receive an adhesive, and
    wherein an inner surface of the housing around the power line passage hole is provided with an adhesive receiving groove (i) greater than the power line passage hole and (ii) in which a portion of the adhesive is received.

2. The valve actuator of claim 1, wherein a number of the plurality of circular grooves is at least twice a number of the plurality of holes.

3. The valve actuator of claim 1, wherein a distance between two consecutive holes of the plurality of holes is less than a distance between two consecutive circular grooves of the plurality of circular grooves.

4. The valve actuator of claim 1, wherein the flange defines a first chamfer at an inner surface of the tap part insertion hole, and
    wherein the first chamfer is configured to, based on the flange being coupled to the ball valve, contact a second chamfer defined at an upper end of the tap portion of the ball valve.

5. The valve actuator of claim 1, wherein the lower case defines a seating part at an upper end, the seating part on which a protruding jaw of a middle plate disposed in the inner space of the housing is seated and configured to receive a first sealing ring, and
    wherein the first sealing ring is supported by a lower end of the upper case, the seating part of the lower case, and the protruding jaw of the middle plate.

6. The valve actuator of claim 5, wherein a second sealing ring is disposed between an upper surface of the flange and a lower surface of the flange coupling part.

7. The valve actuator of claim 6, wherein the motor and the gear assembly are disposed in a space provided between the middle plate and the lower case.

8. The valve actuator of claim 7, wherein the gear assembly includes:
    an input gear coupled to a rotational shaft of the motor and configured to rotate with the rotational shaft,
    an output gear spaced apart from the input gear in a horizontal direction, coupled to a stem of the ball valve, and configured to transmit a rotational force of the input gear to the stem, and
    a power transmission gear configured to transmit the rotational force of the input gear to the output gear, and
    wherein the power transmission gear includes:
        a clutch shaft (i) having both ends coupled to the middle plate and the lower case so as to be movable in a vertical direction, (ii) including a first gear set including a first gear and a second gear that are coupled to the clutch shaft and that are configured to, based on vertical movement of the clutch shaft, disengage from or couple to each other.

9. The valve actuator of claim 8, wherein the first gear provides a coupling part that couples the first gear to the second gear and protruding from a lower surface of the first gear coupled to the input gear,
   wherein an upper surface of the second gear provides a coupling part insertion groove into which the coupling part of the first gear is inserted,
   wherein the clutch shaft provides a push-up part that is configured to push the first gear upward by contacting the coupling part of the first gear and that is positioned in a push-up part insertion groove provided at a lower surface of the coupling part of the first gear.

10. The valve actuator of claim 9, wherein the first gear is configured to move toward the second gear by a return spring disposed between the first gear and the middle plate.

11. The valve actuator of claim 10, further comprising a snap ring disposed at the clutch shaft and between the return spring and an upper surface of the first gear.

12. The valve actuator of claim 11, further comprising a third sealing ring is disposed at the clutch shaft and below the second gear,
   wherein the lower case provides a guide groove at which the clutch shaft is coupled and configured to, based on the clutch shaft moving in the vertical direction, allow the third sealing ring to move in the vertical direction with the clutch shaft.

13. The valve actuator of claim 12, wherein a movement distance of the clutch shaft in an upward direction is based on a gap between the third sealing ring and the second gear.

14. The valve actuator of claim 13, wherein a lower end of an output shaft coupled to the output gear is coupled to the stem of the ball valve, an upper end of the output shaft protrudes to an outside of the upper case, and a fourth sealing ring is disposed between the output shaft and the lower case and between the lower end of the output shaft and the output gear.

15. The valve actuator of claim 14, wherein a fifth sealing ring is disposed between the output shaft and the upper case and between the upper end of the output shaft and the output gear.

16. The valve actuator of claim 15, wherein the power transmission gear further includes a second gear set disposed adjacent to the first gear set in the horizontal direction, and
   wherein the second gear set includes:
      a third gear coupled to the first gear; and
      a fourth gear disposed above the third gear, configured to rotate with the third gear, and coupled to the output gear.

17. The valve actuator of claim 15, wherein the upper case is configured to receive a cap that covers (i) the upper end of the output shaft protruding to the outside of the upper case and (ii) a gap provided between the upper case and the output shaft.

* * * * *